2,980,642

COLOR STABLE LACQUER COMPRISING VINYL CHLORIDE RESIN AND 1,3-BUTYLENE ADIPATE

Collins E. Bushnell, Lancaster, and John A. Parker, West Lampeter Township, Lancaster County, Pa., assignors to Armstrong Cork Company, Lancaster, Pa., a corporation of Pennsylvania No Drawing. Filed Jan. 16, 1958, Ser. No. 709,215

9 Claims. (Cl. 260—31.6)

This invention relates generally to lacquers and more particularly to lacquers containing polymerized vinyl chloride as the film-forming ingredient. Still more particularly the invention relates to polymerized vinyl chloride lacquers which are color-stable over extended periods of time under outdoor conditions.

It is known to form lacquers by dissolving polymerized vinyl chloride such as polyvinyl chloride in a solvent therefor, and incorporating a plasticizer into the composition. It has been found, however, that such compositions will undergo discoloration of the dried film under many conditions. Such discoloration is particularly noticeable when a pigment system has been added to the lacquer; the dried pigmented film undergoes an easily recognized discoloration. It has been thought that degradation of the polymerized vinyl chloride component of the resin may be involved in such discoloration since heat, light, and air are generally required to develop the objectionable stains. Where the polymerized vinyl chloride lacquer is used as a coating on rubber compositions, the discoloration problem has been particularly acute. It is believed that the migration of certain of the antioxidants such as naphthalamines inherently present in many of the rubbers has been at least a contributing cause in the discoloration.

Experimentation has shown that the usual polymerized vinyl chloride stabilizers are useless in avoiding the discoloration of either the clear film or the pigmented film described above. Hence there has been a need for an economical solution to the problem of discoloration of polymerized vinyl chloride lacquers, particularly when used as a coating on rubber products.

It is the primary object of the present invention to supply such a need. It is a further object of the present invention to present a light-, heat-, and air-stable polymerized vinyl chloride lacquer, both clear and pigmented.

These objects are accomplished in a surprisingly effective and straightforward manner. The invention contemplates a composition of a polymerized vinyl chloride resin and a solvent therefor. As a plasticizer for the resin, there is incorporated into the composition 1,3-butylene adipate having a hydroxyl number of 30–50 and an acid number of about 2–7. The composition must also include an aldehyde selected from the group consisting of formaldehyde and a formaldehyde donor.

The resins contemplated for use in forming the lacquers of the present invention are those known polymerized vinyl chloride resins commonly known as solution grade resins. Primarily these resins will include the soft polyvinyl chloride copolymer resins which are readily available on the market under such trademarks as "Exon 470," "Geon 222," and "Vinylite VYHH." These resins are polymerized vinyl chloride resins which are copolymers of vinyl chloride with vinyl acetate; usually 15–2% by weight vinyl acetate based on the total weight of polymerizing monomers is incorporated into such copolymers. Polyvinyl chloride and the vinylidene chloride polymers and copolymers are also operable. The primary criterion of the polymerized vinyl chloride resin useful in the present invention is its ability to dissolve in a solvent and leave a homogeneous film behind once the solvent has evaporated from a film of the organosol.

The solvent system useful in the present invention comprises any of the known solvents for polymerized vinyl chloride resins. The ketones are the solvents of choice and mixtures of ketones will often be used. For example, there may be used methyl isobutyl ketone, ethyl amyl ketone, and diacetone alcohol. The ketones or mixtures thereof will be used in those amounts sufficient to form a solution of the polymerized vinyl halide resin, which solution may be readily painted, sprayed, or brushed onto a surface. An xylol-ethyl amyl ketone mixture gives good results. There may also be used esters, glycol-ethers, nitroparaffins, and other solvents for the polymerized vinyl chloride resins. Generally speaking the solvent system will be used in an amount of about 100–300 parts by weight per each 100 parts by weight of the polymerized vinyl chloride resin. The amount of the solvent system may be increased if desired depending on the amounts of additional ingredients such as pigments, stabilizers, and the like which may be added to the lacquer.

The lacquer of the present invention must contain a plasticizer to insure flexibility, strength, wear resistance, and stability of the final lacquer. It is one of the features of the present invention that the only suitable plasticizer to be used is 1,3-butylene adipate. It has been found that the 1,3-butylene adipate is critical if the final lacquer composition is to have the desired stability. Similar plasticizers have been found to give inferior results. For example, the 2-ethyl hexyl ester of azelaic acid and tetrahydrofurfuryloleate plasticizers still allow the polyvinyl chloride lacquers to stain. In fact even 1,4-butylene adipate—a position isomer of 1,3-butylene adipate—is vastly inferior to the 1,3-butylene adipate in the present composition. The 1,4 compound does not disperse sufficiently well in the polymerized vinyl chloride resin to yield a completely satisfactory film. The amount of 1,3-butylene adipate to be used will be in the range of about 20–60% by weight 1,3-butylene adipate based on the total weight of the polymerized vinyl chloride resin used. To state it another way, there will be used 20–60 parts by weight 1,3-butylene adipate per each 100 parts by weight polymerized vinyl chloride resin.

The 1,3-butylene adipate is a polymeric plasticizer and must have an acid number in the range of about 2–7 and a hydroxyl number in the range of about 30–50. The molecular weight of the polymeric plasticizer having these acid and hydroxyl numbers will generally be in the range of 1300–2300. Hydroxyl numbers and acid numbers outside of the above-stated ranges will produce a polymeric plasticizer substantially less useful than the one described.

The 1,3-butylene adipate is readily prepared by normal polyester technics. The 1,3-butanediol and the adipic acid are admixed in a reactor in amounts such that the 1,3-butanediol is in slight molar excess over the adipic acid. The temperature of the mixture is then raised slowly while the reaction mixture is maintained under an inert gas flow. The temperature should be leveled off at about 200° C. until an acid number of approximately 20 is obtained whereupon the temperature may be increased an additional 20–25 degrees (usually with increased inert gas flow) until the final acid and hydroxyl numbers as stated above are obtained. On cooling, the polymeric ester plasticizer will be found to be a viscous liquid which is noncrystalline at low temperatures. This polymeric material is the 1,3-butylene adipate contemplated for use in the present invention.

The aldehyde to be used in the composition of the present invention is either formaldehyde itself, or a formaldehyde donor under the conditions met during the life of the film. Exemplary of the formaldehyde donors are paraformaldehyde and polyoxymethylene diacetate. Since the volatility of the formaldehyde donors is less than that of formaldehyde itself, formaldehyde donors are generally preferred to formaldehyde. Among the formaldehyde donors, paraformaldehyde is the donor of choice. The amount of formaldehyde or formaldehyde donor to be added to the composition will be in the range of about 1–3% by weight of formaldehyde based on the total weight of the polymerized vinyl chloride resin in the composition. To state it another way, the aldehyde will be added in an amount of about 1–3 parts by weight per each 100 parts by weight of polymerized vinyl chloride resin.

It is the addition of the aldehyde to the composition of the present invention which lends to that composition such unexpectedly excellent properties of color stability. It has been found that the usual polymerized vinyl chloride stabilizers such as dibasic lead phosphite, barium-cadmium laureate complex, epoxy resins, and dibasic lead stearate do not avoid the staining encountered when the lacquer is exposed to out-of-door conditions for a period of time of three months or more. Although the reason for the color-preventing property of the aldehydes in the present composition is not understood, it is postulated that the aldehydes may react with any antioxidants absorbed into the polymerized vinyl chloride film, thus preventing the oxidation and consequent color formation of those antioxidants.

It is generally beneficial to add to the composition of the present invention various of the usual heat and light stabilizers often added to polymerized vinyl chloride resin compositions. Exemplary of some of these stabilizers, as described above, are dibasic lead phosphite (Dyphos), dibasic lead stearate (DS–207), and various inorganic complexes such as that stated to be a complex barium-cadmium organic liquid (Mark M). These heat and light stabilizers are not critical in the composition of the present invention but instead are conventional additives which are frequently added to stabilize the polymerized vinyl chloride resin. It must be emphasized that even the presence of these stabilizers does not prevent discoloration of the film. However, these conventional stabilizers do aid in preventing embrittlement of the film, apparently due to breakdown of the polymerized vinyl chloride molecule into hydrochloric acid or chlorine or both. Hence a preferred embodiment of the present invention calls for the inclusion in the composition of the conventional heat and light stabilizers.

As mentioned earlier the composition of the present invention may be pigmented. Pigmentation is preferably carried out by the addition of a pigment grade of titanium dioxide. Titanium dioxide will impart a white color to the film, but various other colors and pigments may be added in order to impart any desired color to the final lacquer. Antimony oxide is often conveniently added as a component of the pigment system since it also lends itself to the imparting of fire resistance to the dried film.

The forming of the composition of the present invention is a simple matter. The polymerized vinyl chloride resin may be taken up in the solvent system, the 1,3-butylene adipate added and stirred in well, and the formaldehyde or formaldehyde donor added next. The amount of solids in the solution may be adjusted to that which gives the most desirable film forming properties. Where a pigment system is to be incorporated into the composition of the present invention, conventional methods can be used. The 1,3-butylene adipate plasticizer, the pigment, the stabilizer, if any, the antimony oxide, may be run through a ball mill for the necessary hours to produce a proper pigment dispersion. The polymerized vinyl chloride resin may then be taken up in the solvent system and the resulting solution combined with stirring with the pigment dispersion. Alternatively, the pigment and plasticizer may be dispersed in the resin on a two-roll mill. The pigmented lacquer, after any necessary dilution with additional solvent system, is ready for application as desired.

The following examples illustrate several embodiments of the invention. All parts are by weight unless otherwise stated.

*Example I*

The 1,3-butylene adipate was prepared as follows:
To a five-liter four-neck flask was added 1881 grams (20.9 mols) 1,3-butanediol and 2774 grams (19.0 mols) adipic acid. The mixture was heated to 200° slowly and the ester was kept under inert gas flow of one liter per minute. After an acid number of 20 was obtained, the temperature was increased to 220° C. The 220° C. temperature was maintained until the acid number was five and the hydroxyl number was 40. The 1,3-butylene adipate was then cooled.

*Example II*

Into a mixture of 77 parts methyl isobutyl ketone and 50 parts ethyl amyl ketone was dissolved 26.7 parts of 1,3-butylene adipate prepared as described in Example I, and 1.5 parts paraformaldehyde.

A pigment dispersion was prepared containing 57.25 parts pigment grade titanium dioxide, 10 parts antimony oxide, 2.5 parts dibasic lead phosphite, 0.25 part dibasic lead stearate, and 53.3 parts of solution grade vinyl chloride-vinyl acetate copolymer (Exon 470). The pigment dispersion was then taken up in the plasticizer-aldehyde solution to form a lacquer.

A different lacquer was prepared as described immediately above save that the paraformaldehyde was not added. Both lacquers were tested by 100 hours in a Fadeometer; it was established that 100 hours in the Fadeometer was approximately equivalent to three months out of doors at 45° F. facing south, as far as the degree of staining was concerned.

The lacquer containing the paraformaldehyde showed no signs of staining while the lacquer which did not contain the paraformaldehyde showed a yellow stain which was apparent to the unaided eye.

*Example III*

A lacquer was prepared having the following formula:

| Ingredients: | Parts |
|---|---|
| Methyl isobutyl ketone | 90.0 |
| Ethyl amyl ketone | 45.0 |
| 1,3-butylene adipate | 8.3 |
| Paraformaldehyde | 1.5 |
| Vinyl chloride-vinyl acetate copolymer, solution grade (Geon 222) | 46.7 |
| Pigment dispersion: | |
| Titanium dioxide | 57.25 |
| Antimony oxide | 10.0 |
| Dibasic lead phosphite | 2.5 |
| Dibasic lead stearate | 0.25 |
| Vinyl chloride-vinyl acetate copolymer, solution grade (Geon 222) | 20.0 |
| 1,3-butylene adipate | 5.0 |

The pigment dispersion was mixed on a mill, ball milled, and added to the other ingredients.

An identical lacquer made without the paraformaldehyde showed staining in the Fadeometer test while the above-described lacquer showed no staining whatsoever.

*Example IV*

The following formulation was ball milled for 16 hours to obtain complete mixing.

| Ingredients: | Parts |
|---|---|
| 1,3-butylene adipate | 250 |
| Methyl pentachloro stearate | 150 |
| Ester type plasticizer (Morflex P20B) | 100 |
| Antimony oxide | 100 |
| Dibasic lead phosphite | 35 |
| Titanium dioxide | 365 |

Into a solvent system of 882 parts of methyl isobutyl ketone and 882 parts of acetone-free diacetone alcohol there was added 500 parts of solution grade vinyl chloride-vinyl acetate copolymer (Vinylite VAGH), 36 parts isophorone, and 5 parts polyoxymethylene diacetate. The solution was well stirred. This solution was then added to the ball milled product described above to form a lacquer which showed no discoloration after 100 hours in the Fadeometer.

A formula identical to the lacquer described immediately above was prepared save that 10 parts of the polyoxymethylene diacetate was dissolved in the solvent system. An excellent color-stable lacquer resulted.

Lacquers made as described above without any polyoxymethylene diacetate showed appreciable discoloration after 100 hours in the Fadeometer.

We claim:

1. A color-stable lacquer comprising relative proportions of 100 parts by weight polymerized vinyl chloride resin selected from the group consisting of polyvinyl chloride and vinyl chloride-vinyl acetate copolymers containing 2–15% by weight vinyl acetate, about 100–300 parts by weight of a solvent system for said resin, about 20–60 parts by weight 1,3-butylene adipate having a hydroxyl number in the range of about 30–50 and an acid number in the range of about 2–7, and about 1–3 parts by weight of a compound selected from the group consisting of formaldehyde, paraformaldehyde, and polyoxymethylene diacetate.

2. A lacquer according to claim 1 wherein said compound comprises paraformaldehyde.

3. A lacquer according to claim 1 wherein said compound comprises polyoxymethylene diacetate.

4. A lacquer according to claim 1 containing a pigment to impart color to said lacquer.

5. A lacquer according to claim 1 wherein said 1,3-butylene adipate has a hydroxyl number in the range of about 35–45 and an acid number in the range of about 4–6.

6. A lacquer according to claim 5 wherein said 1,3-butylene adipate has a hydroxyl number of about 40 and an acid number of about 5.

7. A lacquer according to claim 1 wherein said solvent comprises a ketone.

8. A lacquer according to claim 1 wherein said polymerized vinyl chloride resin comprises a vinyl chloride-vinyl acetate copolymer.

9. A lacquer according to claim 1 wherein said solvent comprises a mixture of ketones.

References Cited in the file of this patent

UNITED STATES PATENTS

| | | |
|---|---|---|
| 2,414,934 | Denny | Jan. 28, 1947 |
| 2,530,738 | Spessard | Nov. 21, 1950 |
| 2,624,716 | Smith | Jan. 6, 1953 |